United States Patent Office 3,085,901
Patented Apr. 16, 1963

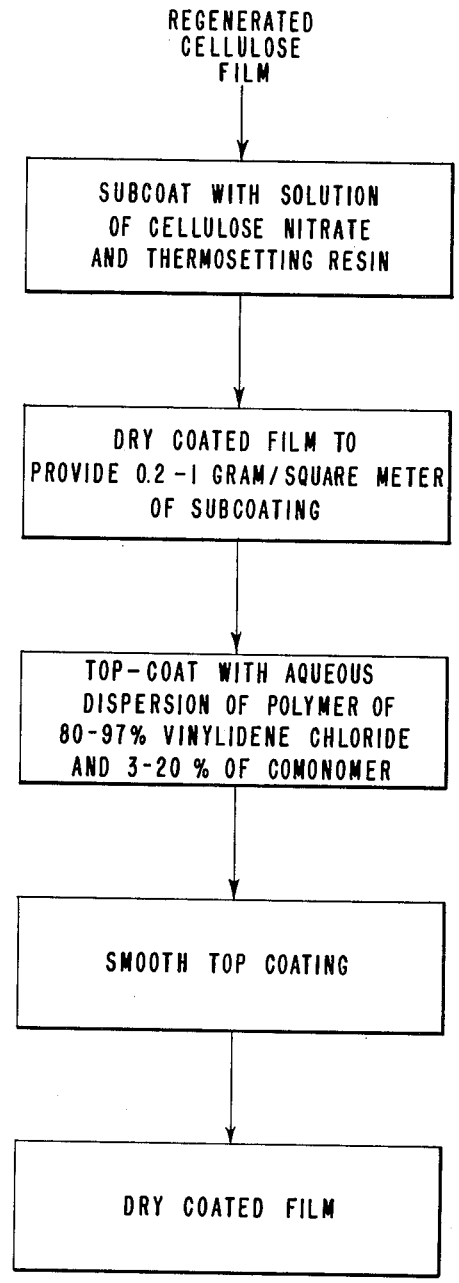

3,085,901
PROCESS FOR COATING REGENERATED CELLULOSE FILM WITH SUBCOAT OF CELLULOSE NITRATE AND THERMOSETTING RESIN AND TOPCOAT OF VINYLIDENE CHLORIDE COPOLYMER
William Bryan Lindsey and Philip John Vanderhorst, Tonawanda, N.Y., assignors to E. I. du Pont de Nemours and Company, Wilmington, Del., a corporation of Delaware
Filed Apr. 28, 1959, Ser. No. 809,341
15 Claims. (Cl. 117—76)

This invention relates to the manufacture of packaging film and more particularly to coating hydrophilic films with compositions containing coalescible, organic, polymeric, film-forming materials.

The coating of films, particularly hydrophilic regenerated cellulose film, is employed to provide moisture resistance and heat-sealability, properties that are usually not inherent in the base film. The most desirable compositions are those containing film-formers which, by coalescing on the surface of the film, provide moisture resistance and heat-sealability without detracting from the strength, flexibility, and transparency of the base film. Copolymers of vinylidene chloride, particularly those in which at least one other mono-olefinic monomer copolymerizable with vinylidene chloride is an alkyl acrylate, alkyl methacrylate, acrylonitrile, methacrylonitrile, methyl vinyl ketone or vinyl chloride, fall into this category. These copolymers may also contain itaconic, acrylic or methacrylic acids as suggested in U.S. Patent 2,570,478.

The most desirable method of applying these coalescible copolymer coatings to regenerated cellulose film is from dispersions of the polymer in water. The use of solutions of the polymer in organic solvents is expensive and the solvents, which are usually inflammable, present a serious hazard to plant operation.

Applying the coalescible, polymeric coatings from aqueous dispersions onto a hydrophilic base film such as regenerated cellulose film, although reducing the expense and lessening the safety problems, poses other problems. The loss of water into the hydrophilic base film tends to set or solidify the polymeric coating prematurely. The time available for removing excess coating and then smoothing and spreading the coating evenly over the surface of the film is thus reduced substantially. The result is usually a streaky, non-uniformly coated film—an undesirable packaging film from the standpoint of unsatisfactory appearance.

The object of the present invention is a process for uniformly coating regenerated cellulose film with a coating containing a coalescible organic, polymeric, film-forming material, particularly a vinylidene chloride copolymer, from an aqueous dispersion without encountering the aforementioned difficulties. Other objects will appear hereinafter.

The objects are accomplished by a process which comprises subcoating the regenerated cellulose film with a cellulosic lacquer coating, preferably a cellulose derivative and a suitable thermosetting resin, prior to applying the aqueous dispersion of the vinylidene chloride polymer.

Specifically, the process comprises subcoating a nonfibrous regenerated cellulose base film with a solution in an organic solvent of a cellulose derivative of the class consisting of cellulose esters and cellulose ethers, preferably with a thermosetting resin also dissolved therein, the cellulose derivative comprising 25–100% and the thermosetting resin comprising up to 75%, preferably 5–50%, of the dissolved solids; heating the subcoated film to remove solvent and, if the thermosetting resin is present, to further polymerize the resin; thereafter top-coating the subcoated film with an aqueous dispersion of a polymer obtained from 80–97% vinylidene chloride and 3–20% of at least one other polymerizable mono-olefinic monomer copolymerizable with vinylidene chloride; and drying the twice coated film. A flow sheet of the process of this invention is presented in the drawing.

The coatings may be applied in accordance with any known coating techniques. They may be applied by passing the film through baths containing the coating compositions, the passage being either in a continuous or batch manner. The coatings may also be sprayed onto the film or applied manually by brushing or the like.

The thickness of the coatings may be adjusted in accordance with methods well known in the coating art. To achieve the result of the present invention, a smooth, uniform top-coating, the subcoating must have a thickness equivalent to at least 0.2 gram/square meter on the surface. Less than 0.2 gram/square meter permits too rapid penetration of water from the top-coating dispersion. The top-coating tends to harden to quickly and a non-uniform striated coated film results. Additional improvements in retarding water loss from the top-coating are achieved up to a subcoating thickness equivalent to about 0.6 gram/square meter. However, for some coating compositions within the scope of the present invention, the thickness may reach about 2 grams/square meter without any deleterious effect. Above about 2 grams/square meter, degrading of durability and higher moisture transmission for the coated film are observed. For other compositions of the present invention, the upper limit on thickness may be about 1 gram/square meter.

Selection of the thickness of the top-coating depends to some extent on the properties to be emphasized. Thus, top-coatings of 3–12 grams/square meter may be used. The heavier or thicker coatings provide greater impermeability to moisture and gases. The thinner coatings provide greater durability, flexibility and the like at the expense of some of the impermeability.

The resulting double coated films are clear and sparkling and can be used advantageously wherever regenerated cellulose films have been used before. In particular, the films resulting from this invention are excellent moisture-proof packaging materials for foods, cigarettes and the like.

SUBCOATING COMPOSITIONS

The subcoating compositions are solutions of cellulose derivatives with or without thermosetting resins in organic solvents. They are prepared in the conventional manner by merely stirring the ingredients in the solvent at normal temperatures.

The cellulose derivatives which may be used in this composition include the cellulose esters and cellulose ethers listed below:

*Cellulose Esters*

Cellulose acetate
Cellulose formate
Cellulose propionate
Cellulose butyrate
Cellulose nitrate Celluose acetate-butyrate
Celluose acetate-propionate
Celluose acetate-nitrate
Celluose acetate-glycolate
Celluose acetate-stearate

*Cellulose Ethers*

Methyl cellulose
Ethyl cellulose
Butyl cellulose

Hydroxyethyl cellulose
Carboxymethyl cellulose
Benzyl cellulose

The preferred cellulose derivative for use in the subcoating is cellulose nitrate having a nitrogen content between 10.5% and 12.2%.

The limitations on the cellulose derivative are substantial insolubility in water (less than 0.7 gram/100 mls. water at 20° C.) and solubility in the organic solvent (at least 5 grams/100 mls. ethyl acetate at 20° C.). The thermosetting resin, although not necessarily insoluble in water when applied to the base film, should be substantially insoluble in water prior to the application of the top-coating. This can be done by curing with a catalyst and/or heat treatment.

Other organic solvents, besides ethyl acetate, which are useful in preparing the subcoating include acetone, ethanol, butanol, toluene, benzene, xylene, amyl acetate, diacetone alcohol, benzyl alcohol and the like and mixtures thereof. In general, any organic solvent for the ingredients of the subcoating that is volatile and does not affect the base film adversely may be used. The consistency of the subcoating solution is determined by the coating method to be employed, the coating thickness desired and similar considerations. In general, solutions containing from 1% to about 20% of the dissolved solids are satisfactory.

Suitable thermosetting resins for use in the subcoating include the ether type derivatives formed from melamine, urea, phenol, etc. with formaldehyde in the presence of monohydric alcohols such as propyl, butyl, isobutyl, hexyl, octyl, lauryl, benzyl and the like. Other useful resins for the subcoating are acetone-furfural and triacetin resin. As stated previously, these resins are all characterized by solubility in the common non-aqueous organic solvents and eventual insolubility in water, i.e., they can be cured to be water-insoluble during the drying of the subcoated film and may be polymerized further during the drying of the top-coated film.

To promote polymerization and hardening of the thermosetting resin, it may be desirable to incorporate an acid catalyst in the subcoating composition. Such catalysts are well known in the art and include the usual acidic condensing agents of which maleic acid and para-toluene sulfonic acid in amounts of 0.1–40%, based on the resin, are particularly preferred. The required degree of polymerization is usually achieved after a few seconds exposure to air heated to 100° C. and, hence, is readily obtained in the solvent removal stage.

TOP-COATING COMPOSITIONS

The top-coating compositions are dispersions of vinylidene chloride copolymers in water. Because of superior moistureproofness, copolymers containing at least 80% vinylidene chloride are preferred. However, the invention is applicable wherever it is desired to apply a composition of any coalescible polymeric film former having less than 80% vinylidene chloride in the polymer from an aqueous dispersion and where premature hardening of the film former is a problem.

In the preferred film formers of the top-coating composition, 3–20% of the copolymer with vinylidene chloride is composed of at least one other polymerizable mono-olefinic monomer copolymerizable with vinylidene chloride. As this other monomer, any of the following may be used: methyl, ethyl, isobutyl, butyl, octyl and 2-ethylhexyl acrylates and methacrylates; phenyl methacrylate, cyclohexyl methacrylate, p-cyclohexylphenyl methacrylate, methoxyethyl methacrylate, chloroethyl methacrylate, 2-nitro-2-methylpropyl methacrylate, and the corresponding esters of acrylic acid; methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene ethyl vinyl ether, N-vinyl phthalimide, N-vinyl succinimide, N-vinyl carbazole, isopropenyl acetate, methylene diethyl malonate, acrylamide, methacrylamide or mono-alkyl substitution products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride, allyl glycidyl ether and other unsaturated aliphatic ethers described in U.S. Patent 2,160,943. These compounds may be described as vinyl or vinylidene compounds having a single $CH_2=C<$ group, the most useful ones falling within the general formula

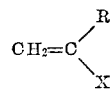

where R may be hydrogen, a halogen or a saturated aliphatic radical and X is selected from one of the following groups: —CL, —Br, —F, —CN, —$C_6H_5$,

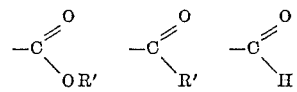

—$OC_6H_5$, —$CONH_2$, —CONH—R', and —$CONR'_2$, in which R' is alkyl.

For optimum properties, unsaturated aliphatic acids such as itaconic acid, acrylic acid or methacrylic acid are incorporated in the top-coating composition, preferably to the extent of 0.1–3% based on the weight of the polymer in the aqueous dispersion. The presence of the acid tends to promote anchorage of the top-coating and also tends to improve the heat-sealability of the final double coated film.

The invention will be more clearly understood by referring to the examples which follow, Example 1 representing the best mode contemplated for carrying out the invention.

It will be noted that in some of the examples the film is pretreated prior to coating with a guanidine-urea-formaldehyde resin as described in U.S. Patent 2,533,557 to Chapman. This resin which is water-soluble is impregnated into the film usually during the softening treatment and serves to improve the adhesion of the subsequently applied coatings to the film. Water-soluble resins derived from phenol-aldehyde, urea-aldehyde, melamine-aldehyde, etc., as disclosed in U.S. Patents 2,159,007 to Charch et al., 2,432,542 to Pitzl, 2,546,575 to Wooding, 2,646,368 to Wooding et al., 2,688,570 to Wooding, 2,699,406 to Rosser and 2,796,362 to Wooding may be used instead of the guanidine-urea formaldehyde resin for the same purpose.

EXAMPLE 1

A regenerated cellulose film, about 0.0009" thick, was prepared in the following conventional manner. A viscose solution was extruded through a slotted hopper into a solution of sulfuric acid and sodium sulfate to form a gel regenerated cellulose film. The film was washed, desulfured, softened and dried. During softening the film was treated to contain 0.3% of a guanidine-urea-formaldehyde resin, the resin having been obtained by the reaction of guanidine nitrate, urea and formaldehyde as described in Example 1 of U.S. Patent 2,533,557 to Chapman.

The dried film was passed through a bath containing the subcoating composition at a rate to coat the film with 1 gram of solids/square meter (0.5 gram/square meter on each side). The subcoating composition had been prepared by dissolving nitrocellulose, also called cellulose nitrate, and an isobutanol-modified urea formaldehyde resin in a solvent mixture. Maleic acid, formed in situ by adding the anhydride and water, was used to improve subsequent polymerization of the resin. The subcoating composition was prepared from the following ingredients:

| | Parts |
|---|---|
| Nitrocellulose (11.6% nitrogen) | 33.0 |
| Isobutanol-modified urea formaldehyde resin | 23.6 |
| Ethyl acetate | 561.2 |
| Toluene | 302.2 |
| Ethyl alcohol | 14.1 |
| Isobutanol | 46.7 |
| Maleic anhydride | 8.0 |
| Water | 11.2 |

The subcoated film was then dried by subjecting the film to air at a temperature of 140° C. for 1.5 seconds.

Next the film was coated with the top-coating composition. The top-coating was applied by passing the subcoated film through a bath containing an aqueous dispersion of the vinylidene chloride copolymer, the top-coating composition. Specifically, the top-coating composition had been prepared from the following ingredients:

| | Parts |
|---|---|
| Water | 400 |
| Vinylidene chloride | 380 |
| Methyl acrylate | 20 |
| Itaconic acid | 8 |
| "Duponol" ME (sodium lauryl sulfate) | 8 |
| "Darvan" #1 (condensation product of sodium beta-naphthalene sulfonate and formaldehyde) | 4 |
| Ammonium persulfate | 2 |
| Meta-sodium bisulfite | 1 |

The water, ammonium persulfate and "Duponol" ME were placed in a round-bottom vessel. The vessel, fitted with a reflux condenser and a stirrer, was immersed in a water bath maintained at 33° C.–34° C. After stirring until solution was complete, the premixed monomers (vinylidene chloride, methyl acrylate and itaconic acid) were added followed by the addition of the meta-sodium bisulfite. Polymerization was accomplished by refluxing at the prevailing temperature, 33° C.–34° C. After 1½ hours, refluxing ceased indicating that polymerization was substantially complete. Stirring was continued for another 30 minutes to assure complete polymerization. "Darvan" #1 was then added to the dispersion.

The dispersion was coated on both sides of the previously subcoated regenerated film to the extent of 6 grams of polymer per square meter of film (3 grams/square meter per side). The twice coated film was then passed through smoothing rolls; dried at a temperature of 180° C.; and collected by winding on a roll. The resulting double coated film was clear, sparkling and had a Grade 1 striation appearance.

The identical regenerated cellulose film was coated with the same polymeric aqueous dispersion (the top-coating composition) in the same manner using doctor rolls but without using the nitrocellulose-containing subcoating. The coating thickened so rapidly that it was not possible to smooth it before it hardened and the resulting single-coated film was badly striated, having a Grade 4 striation appearance.

"Striation appearance" is a comparative measure of the striae which appear as a series of parallel lines in the coating. Striations are projected onto a screen by means of a Sylvania C25/DC/5 concentrated arc lamp, placing a sample of the film between the lamp and the screen. In this way, samples are graded by comparison, as follows:

Grade 1—Absence of striations—excellent appearance
Grade 2—Slight striations—good appearance
Grade 3—Moderate striations—borderline appearance
Grade 4—Unacceptable striations

EXAMPLE 2

Regenerated cellulose film, 0.0012" thick, impregnated with 0.3% of the guanidine-modified urea-formaldehyde resin and prepared as in Example 1 was subcoated with the same composition as was used in Example 1 at the rate of approximately 1 gram of solids/square meter (0.5 gram on each side).

After drying, the film was passed through the aqueous polymeric dispersion which comprised the top-coating composition. The polymeric aqueous dispersion had been prepared from the following ingredients in the manner described in Example 1:

| | Parts |
|---|---|
| Water | 400 |
| Vinylidene chloride | 368 |
| Methyl acrylate | 14 |
| Acrylonitrile | 10 |
| Itaconic acid | 8 |
| "Duponol" ME | 8 |
| "Darvan" #1 | 4 |
| Ammonium persulfate | 0.8 |
| Meta-sodium bisulfite | 0.4 |

The dispersion was applied using doctor rolls, to the extent of 6 grams of polymer per square meter of film (3 grams/square meter per side). After drying at a temperature of 185° C., a clear, sparkling double-coated film with Grade 1 striation appearance resulted.

The same polymer dispersion, when coated with doctor rolls on regenerated cellulose film having no nitrocellulose subcoating, thickened so quickly that it was not possible to smooth it out. The dried coating was badly striated, having a striation appearance of Grade 4.

EXAMPLE 3

Example 1 was repeated using the same subcoating composition but using a top-coating composition prepared as in Example 1 from the following ingredients:

| | Parts |
|---|---|
| Water | 200 |
| Vinylidene chloride | 184 |
| Butyl methacrylate | 16 |
| Itaconic acid | 4 |
| "Duponol" ME | 4 |
| "Darvan" #1 | 2 |
| Ammonium persulfate | 1 |
| Meta-sodium bisulfite | 0.5 |

The double-coated film had a Grade 1 striation appearance.

EXAMPLE 4

Example 1 was repeated using the same subcoating composition but using a top-coating composition prepared as in Example 1 from the following ingredients:

| | Parts |
|---|---|
| Water | 90 |
| Vinylidene chloride | 82.8 |
| Methacrylonitrile | 7.2 |
| Itaconic acid | 1.8 |
| Sulfated methyl oleate | 4.5 |
| "Darvan" #1 | 1 |
| Ammonium persulfate | 0.9 |

The double-coated film had a Grade 1 striation appearance.

EXAMPLE 5

Regenerated cellulose film, 0.0012" thick, prepared substantially as in Example 1, was subcoated with a composition consisting of a 6% solution of 65% butanol-modified melamine formaldehyde resin, 10% para-toluene sulfonic acid and 25% nitrocellulose (11.6% nitrogen) in ethyl acetate. The coating was applied at the rate of 2 grams of solids/square meter of film (1 gram/square meter on each side). The subcoated film was dried by exposure to air at a temperature of 140° C. for 2 seconds.

The subcoated film was then top-coated with the polymeric aqueous dispersion of Example 1 (3 grams/square meter on each side), using doctor rolls. A clear, sparkling coated film resulted having Grade 1 striation appearance.

The same polymeric aqueous dispersion when coated on the regenerated cellulose film having no subcoating, using doctor rolls, coalesced so rapidly that it was not possible to smooth it out and the dried coating was badly striated—Grade 4 striation appearance.

EXAMPLE 6

Regenerated cellulose film, 0.0012" thick, prepared substantially as in Example 1, was subcoated with a composition consisting of a 10% solution of 24% n-butanol modified melamine formaldehyde resin, 71% nitrocellulose (11.4% nitrogen) and 5% maleic acid in a solvent mixture. The solvent mixture consisted of 93.5% ethyl acetate, 1.5% toluene and 5.0% n-butanol. The subcoating was applied at the rate of 1 gram of solids per square meter of film (0.5 gram/square meter on each side). The subcoated film was dried at a temperature of 130–140° C. for 2 seconds.

When top-coated with the polymeric aqueous dispersion of Example 1 at the rate of 3 grams/square meter of solids, a clear, sparkling coated film with Grade 1 striation appearance resulted.

EXAMPLE 7

Regenerated cellulose film, 0.0009" thick, prepared substantially as in Example 1, was subcoated with a composition comprising 9 parts of ethyl cellulose, 59 parts of xylene, 25 parts of ethyl lactate and 7 parts of butyl titanate. The ethyl cellulose used had a viscosity of 10 centipoises and contained 2.6 ethoxyl groups per anhydroglucose unit. The subcoating was applied at the rate of 1 gram of solids per square meter of film (0.5 gram/square meter on each side). The subcoated film was dried by exposure to air at a temperature of 130°–140° C. for 2 seconds.

When top-coated with the polymeric aqueous dispersion of Example 3, a smooth, clear double-coated film with Grade 1 striation appearance resulted.

EXAMPLE 8

Regenerated cellulose film, 0.0012" thick, prepared substantially as in Example 1, was subcoated with a composition prepared from the following ingredients:

| | Parts |
|---|---|
| Cellulose acetate | 20 |
| Adipamido diethyl propionate | 10 |
| Phenol formaldehyde resin | 25 |
| Acetone | 100 |
| Ethyl alcohol | 20 |
| Benzene | 50 |
| Diacetone alcohol | 30 |

The subcoating was applied at the rate of 1 gram of solids per square meter of film (0.5 gram/square meter on each side). The subcoated film was dried by exposure to air at a temperature of 130°–140° C. for 2 seconds.

When top-coated with the polymeric aqueous dispersion of Example 1, a smooth, clear coated film with Grade 1 striation appearance resulted.

EXAMPLE 9

Regenerated cellulose film, 0.0009" thick, prepared substantially as in Example 1, was subcoated with a composition comprising:

| | Parts |
|---|---|
| Cellulose acetate | 20 |
| Acetone-furfural resin | 5 |
| Acetone | 50 |
| Ethyl acetate | 20 |
| Benzene | 30 |
| Benzyl alcohol | 5 |

The subcoating was applied at the rate of 1 gram of solids per square meter of film (0.5 gram/square meter on each side). The subcoated film was dried at a temperature of 130°–140° C. for 2 seconds.

When top-coated with the polymeric aqueous dispersion of Example 2, a smooth, clear coated film with Grade 1 striation appearance resulted.

EXAMPLE 10

Regenerated cellulose film, 0.0012" thick, was subcoated with a composition comprising 90 parts cellulose acetate, 10 parts cellulose stearate and 5 parts triacetin dissolved in a mixture of 200 parts acetone and 200 parts benzene. The coating was applied at the rate of 1 gram of solids per square meter of film (0.5 gram/square meter on each side). The subcoated film was dried at a temperature of 130°–140° C. for 2 seconds.

When top-coated with the polymeric aqueous dispersion of Example 1, a smooth, clear coated film with Grade 1 striation appearance resulted.

What is claimed is:

1. A process for preparing film which comprises subcoating at least one surface of a non-fibrous regenerated cellulose base film with a solution in an organic solvent of a cellulose derivative of the class consisting of cellulose esters and cellulose ethers and an organic solvent-soluble thermosetting resin, the cellulose derivative comprising 25–100% and the thermosetting resin comprising up to 75% of the dissolved solids in said solution, the solids coated on said surface being sufficient to provide a dried subcoating of 0.2–0.6 gram/square meter of said surface; drying the subcoated film; thereafter, top-coating the subcoated film with an aqueous dispersion of a polymer obtained from 80–97% vinylidene chloride and 3–20% of at least one other polymerizable mono-olefinic monomer copolymerizable with vinylidene chloride; smoothing said top-coating; and drying the twice-coated film.

2. A process as in claim 1 wherein the cellulose derivative in the subcoating is cellulose nitrate having a nitrogen content of 10.5–12.2%.

3. A process as in claim 1 wherein the cellulose derivative in the subcoating is cellulose acetate.

4. A process as in claim 1 wherein the cellulose derivative in the subcoating is cellulose stearate.

5. A process as in claim 1 wherein the cellulose derivative in the subcoating is ethyl cellulose.

6. A process as in claim 1 wherein the thermosetting resin is a monohydric alcohol-modified melamine formaldehyde resin.

7. A process as in claim 1 wherein the thermosetting resin is a monohydric alcohol-modified urea formaldehyde resin.

8. A process as in claim 1 wherein the thermosetting resin is a monohydric alcohol-modified phenol formaldehyde resin.

9. A process as in claim 1 wherein the polymer in the top-coating is obtained from 80–97% vinylidene chloride and 3–20% of an alkyl acrylate.

10. A process as in claim 1 wherein the polymer in the top-coating is obtained from 80–97% vinylidene chloride and 3–20% of acrylonitrile.

11. A process as in claim 1 wherein the polymer in the top-coating is obtained from 80–97% vinylidene chloride and 3–20% of methacrylonitrile.

12. A process as in claim 1 wherein the polymer in the top-coating is obtained from 80–97% vinylidene chloride and 3–20% of alkyl methacrylate.

13. A process as in claim 1 wherein the polymer in the top-coating contains 0.1–3% based on the weight of the polymer of an unsaturated aliphatic acid selected from the group consisting of itaconic acid, acrylic acid and methacrylic acid.

14. A process as in claim 1 wherein the top-coating is applied to a thickness of 3 grams–12 grams of solids/square meter.

15. A process for preparing film which comprises subcoating at least one surface of a non-fibrous regenerated cellulose base film with a solution in an organic solvent of cellulose nitrate and an organic solvent-soluble thermosetting resin, the cellulose nitrate comprising 25–100% and the thermosetting resin comprising up to 75% of the dissolved solids in said solution, the solids coated on said surface being sufficient to provide a dried subcoating of 0.2–1 gram/square meter of said surface; drying the subcoated film; thereafter, top-coating the subcoated film with an aqueous dispersion of a polymer obtained from 80–97% vinylidene chloride and 3–20% of at least one other polymerizable mono-olefinic monomer copolymerizable with vinylidene chloride; smoothing said top-coating; and drying the twice-coated film.

References Cited in the file of this patent

UNITED STATES PATENTS

| | | |
|---|---|---|
| 2,229,616 | Wampner | Jan. 21, 1941 |
| 2,462,185 | Hauser | Feb. 22, 1949 |
| 2,491,023 | Alles et al. | Dec. 13, 1949 |
| 2,570,478 | Pitzl | Oct. 9, 1951 |
| 2,684,919 | Berry et al. | July 27, 1954 |
| 2,819,984 | Ackerman | Jan. 14, 1958 |
| 2,819,985 | Cobbs | Jan. 14, 1958 |
| 2,955,958 | Brown | Oct. 11, 1960 |
| 2,956,903 | Spencer | Oct. 18, 1960 |